(12) United States Patent
Rosell et al.

(10) Patent No.: US 11,823,413 B2
(45) Date of Patent: *Nov. 21, 2023

(54) EYE GAZE TRACKING SYSTEM, ASSOCIATED METHODS AND COMPUTER PROGRAMS

(71) Applicant: Tobii AB, Danderyd (SE)

(72) Inventors: Mikael Rosell, Danderyd (SE); Simon Johansson, Danderyd (SE); Pravin Kumar Rana, Danderyd (SE); Yimu Wang, Danderyd (SE); Gilfredo Remon Salazar, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,307

(22) Filed: Jan. 25, 2023

(65) Prior Publication Data

US 2023/0162393 A1    May 25, 2023

Related U.S. Application Data

(63) Continuation of application No. 17/136,640, filed on Dec. 29, 2020, now Pat. No. 11,593,962.

(51) Int. Cl.
*G06T 7/73* (2017.01)
*G06F 3/01* (2006.01)

(52) U.S. Cl.
CPC ............... *G06T 7/74* (2017.01); *G06F 3/013* (2013.01); *G06T 2207/30201* (2013.01)

(58) Field of Classification Search
USPC ......................................................... 382/103
See application file for complete search history.

(56) References Cited

U.S. PATENT DOCUMENTS 9,940,518 B1    4/2018  Klingstrom et al.
10,871,825 B1   12/2020 Sztuk et al.
(Continued)

FOREIGN PATENT DOCUMENTS

WO    2019187808 A1    10/2019

OTHER PUBLICATIONS

U.S. Appl. No. 17/136,640, "Notice of Allowance", dated Jul. 12, 2022, 10 pages.
(Continued)

*Primary Examiner* — Gabriel I Garcia
(74) *Attorney, Agent, or Firm* — Christopher Ignatius Moylan

(57) ABSTRACT

An eye tracking system configured to: receive a plurality of right eye images of a right eye of a user; receive a plurality of left eye images of a left eye of a user, each left eye image corresponding to a right eye image in the plurality of right eye images; detect a pupil and determine an associated pupil signal, for each of the plurality of right eye images and each of the plurality of left eye images; calculate a right eye pupil variation of the pupil signals for the plurality of right eye images and a left eye pupil variation of the pupil signals for the plurality of left eye images; and determine a right eye weighting and a left eye weighting based on the right eye pupil variation and the left eye pupil variation. For one or more right eye images and one or more corresponding left eye images, the eye tracking system can: determine at least one right eye gaze signal based on the right eye image and at least one left eye gaze signal based on the corresponding left eye image; and calculate a combined gaze signal from a weighted sum of the right eye gaze signal and the left eye gaze signal using the right eye weighting and the left eye weighting.

19 Claims, 4 Drawing Sheets

(56) References Cited

U.S. PATENT DOCUMENTS

| | | | |
|---|---|---|---|
| 11,593,962 B2* | 2/2023 | Rosell | G06T 7/74 |
| 2010/0328444 A1* | 12/2010 | Blixt | A61B 3/113 |
| | | | 348/78 |
| 2012/0189160 A1 | 7/2012 | Kaneda et al. | |
| 2016/0004303 A1 | 1/2016 | Arar et al. | |
| 2019/0108383 A1 | 4/2019 | Klingstrom et al. | |
| 2019/0317598 A1 | 10/2019 | Aleem et al. | |
| 2020/0097076 A1 | 3/2020 | Alcaide et al. | |
| 2020/0183490 A1 | 6/2020 | Klingstrom et al. | |
| 2020/0241635 A1 | 7/2020 | Cohen | |
| 2021/0173474 A1 | 6/2021 | Sztuk et al. | |

OTHER PUBLICATIONS

U.S. Appl. No. 17/136,640, "Notice of Allowance", dated Nov. 14, 2022, 8 pages.

European Patent Application No. 21216870.2, "Extended European Search Report", dated Jun. 1, 2022, 12 pages.

* cited by examiner

EYE GAZE TRACKING SYSTEM, ASSOCIATED METHODS AND COMPUTER PROGRAMS

CROSS-REFERENCES TO RELATED APPLICATIONS

This application is a continuation of U.S. patent application Ser. No. 17/136,640, filed Dec. 29, 2020 and entitled "EYE GAZE TRACKING SYSTEM, ASSOCIATED METHODS AND COMPUTER PROGRAMS," which is incorporated by reference herein in its entirety for all purposes.

TECHNICAL FIELD

The present disclosure generally relates to the field of eye tracking. In particular, the present disclosure relates to systems and methods that use pupil detection in eye images as part of an eye tracking system.

BACKGROUND

In eye tracking applications, digital images are retrieved of the eyes of a user and the digital images are analysed in order to estimate the gaze direction of the user. The estimation of the gaze direction may be based on computer-based image analysis of features of the imaged eye. Many eye tracking systems estimate gaze direction based on identification of a pupil position together with glints or corneal reflections. Therefore, accuracy in the estimation of gaze direction may depend upon an accuracy of the identification or detection of the pupil position and/or the corneal reflections. One or more spurious image features such as stray reflections may be present in the digital images which can detrimentally affect eye feature identification.

One known example method of eye tracking includes the use of infrared light and an image sensor. The infrared light is directed towards the pupil of a user and the reflection of the light is captured by an image sensor.

Portable or wearable eye tracking devices have also been previously described. One such eye tracking system is described in U.S. Pat. No. 9,041,787 (which is hereby incorporated by reference in its entirety). A wearable eye tracking device is described using illuminators and image sensors for determining gaze direction. The processing power of hardware in a portable of wearable eye tracking device can be limited relative to a free-standing or remote system.

SUMMARY

According to a first aspect of the invention, there is provided an eye tracking system configured to:
receive a plurality of right-eye-images of a right eye of a user;
receive a plurality of left-eye-images of a left eye of a user, each left-eye-image corresponding to a right-eye-image in the plurality of right-eye-images;
detect a pupil and determine an associated pupil-signal, for each of the plurality of right-eye-images and each of the plurality of left-eye-images;
calculate a right-eye-pupil-variation of the pupil-signals for the plurality of right-eye-images and a left-eye-pupil-variation of the pupil-signals for the plurality of left-eye-images;
determine a right-eye-weighting and a left-eye-weighting based on the right-eye-pupil-variation and the left-eye-pupil-variation; and
for one or more right-eye-images and one or more corresponding left-eye-images:
determine at least one right-eye-gaze-signal based on the right-eye-image and at least one left-eye-gaze-signal based on the corresponding left-eye-image; and
calculate a combined-gaze-signal from a weighted sum of the right-eye-gaze-signal and the left-eye-gaze-signal using the right-eye-weighting and the left-eye-weighting.

Such a combined-gaze-signal can have an improved accuracy and/or precision. It has been found that a particularly good combined-gaze-signal can be achieved by using the variation in the pupil-signals to determine weightings. In particular, the pupil-signals can be considered as intermediate signals in the determination of the combined-gaze-signal. It has thus been found that calculating the weightings based on the (intermediate) pupil-signals can result in particularly good improvements to the combined-gaze-signal.

The pupil-signal may comprise a pupil-position and/or a pupil-radius.

The right-eye-gaze-signal may comprise a right-eye-gaze-origin-signal. The left-eye-gaze-signal may comprise a left-eye-gaze-origin-signal. The combined-gaze-signal may comprise a combined-gaze-origin-signal.

Determining a right-eye-gaze-signal and a left-eye-gaze-signal may comprise determining a right-eye-gaze-origin-signal based on the right-eye-image and a left-eye-gaze-origin-signal based on the corresponding left-eye-image. Calculating a combined-gaze-signal may comprise calculating a combined-gaze-origin-signal from a weighted sum of the right-eye-gaze-origin-signal and the left-eye-gaze-origin-signal using the right-eye-weighting and the left-eye-weighting.

The eye tracking system may be configured to determine a right-eye-gaze-origin-signal by detecting one or more glints in the right-eye-image and calculating the right-eye-gaze-origin-signal based on the one or more glints; and determine a left-eye-gaze-origin-signal by detecting one or more glints in the left-eye-image and calculating the left-eye-gaze-origin-signal based on the one or more glints.

The eye tracking system may be configured to set the right-eye-weighting to zero if the right-eye-gaze-origin-signal is located outside an expected-right-eye-origin-region; and/or set the left-eye-weighting to zero if the left-eye-gaze-origin-signal is located outside an expected-left-eye-origin-region.

The right-eye-gaze-signal may comprise a right-eye-gaze-direction-signal. The left-eye-gaze-signal may comprise a left-eye-gaze-direction-signal. The combined-gaze-signal may comprise a combined-gaze-direction-signal.

Determining a right-eye-gaze-signal and a left-eye-gaze-signal may comprise determining a right-eye-gaze-direction-signal based on the right-eye-image and a left-eye-gaze-direction-signal based on the corresponding left-eye-image. Calculating a combined-gaze-signal may comprise calculating a combined-gaze-direction-signal from a weighted sum of the right-eye-gaze-direction-signal and the left-eye-gaze-direction-signal using the right-eye-weighting and the left-eye-weighting.

The eye tracking system may be configured to:
determine a right-eye-gaze-direction-signal by:
  detecting one or more glints in the right-eye-image;
  calculating the right-eye-gaze-origin-signal based on the one or more glints;
  determining a right-eye-pupil-position of the detected pupil in the right-eye-image; and
  calculating a right-eye-gaze-direction-signal based on the right-eye-gaze-origin-signal and the pupil-position.

The eye tracking system may be configured to:
determine a left-eye-gaze-direction-signal by:
  detecting one or more glints in the left-eye-image;
  calculating the left-eye-gaze-origin-signal based on the one or more glints;
  determining a left-eye-pupil-position of the detected pupil in the left-eye-image; and
  calculating a left-eye-gaze-direction-signal based on the left-eye-gaze-origin-signal and the pupil-position.

The eye tracking system may be configured to determine the right-eye-weighting and the left-eye-weighting such that they are normalised, for instance such that they sum to 1.

The right-eye-pupil-variation may be based on a standard deviation of the pupil-signals for the plurality of right-eye-images. The left-eye-pupil-variation may be based on a standard deviation of the pupil-signals for the plurality of left-eye-images.

The eye tracking system may be configured to:
determine the right-eye-weighting based on a non-linear function that relates the right-eye-pupil-variation to the right-eye-weighting; and
determine the left-eye-weighting based on a non-linear function that relates the left-eye-pupil-variation to the left-eye-weighting.

The eye tracking system may be configured to:
determine one or more further eye-feature-signals, for each of the plurality of right-eye-images and each of the plurality of left-eye-images;
for each of the one or more further eye-feature-signals:
  calculate a right-eye-feature-variation based on the eye-feature-signals for the plurality of right-eye-images; and
  calculate a corresponding left-eye-feature-variation based on the eye-feature-signals for the plurality of left-eye-images; and
determine the right-eye-weighting and the left-eye-weighting based on the right-eye-pupil-variation, the left-eye-pupil-variation, the one or more right-eye-feature-variations and the one or more left-eye-feature-variations.

The eye tracking system may be configured to determine the right-eye-weighting and the left-eye-weighting by:
determining a pupil-weighting-pair comprising a right-eye-pupil-weighting based on the right-eye-pupil-variation and a left-eye-pupil-weighting based on the left-eye-pupil-variation;
for each of the one or more further eye-feature-signals:
  determining a feature-weighting-pair comprising a right-eye-feature-weighting based on the right-eye-feature-variation and a left-eye-feature-weighting based on the left-eye-feature-variation;
normalising the pupil-weighting-pair and the one or more feature-weighting-pairs;
determining a minimum-normalised-weight of all normalised-weights in the normalised pupil-weighting-pair and the one or more normalised feature-weighting-pairs; and
determining the right-eye-weighting and the left-eye-weighting as the normalised pupil-weighting-pair or normalised-feature-weighting-pair that contains the minimum-normalised-weight.

The eye tracking system may be configured to:
determine the right-eye-weighting based on a non-linear function that relates the right-eye-pupil-variation to the right-eye-weighting;
determine the left-eye-weighting based on a non-linear function that relates the left-eye-pupil-variation to the left-eye-weighting.
determine the one or more right-eye-feature-weightings based on a non-linear function that relates associated right-eye-feature-weightings to the one or more right-eye-feature-weightings; and/or
determine the one or more left-eye-feature-weightings based on a non-linear function that relates associated left-eye-feature-weightings to the one or more left-eye-feature-weightings.

The one or more further eye-feature-signals may represent one or more of:
pupil position;
pupil radius;
gaze origin;
a cornea-feature (as embodied by a cornea-signal), such as a cornea position and/or one or more corneal reflections;
iris position;
iris radius;
eye-corner position; and
number of matched illuminator-glint pairs.

The right-eye-gaze-signal may comprise a right-eye-gaze-origin-signal. The left-eye-gaze-signal may comprise a left-eye-gaze-origin-signal. The combined-gaze-signal may comprise a combined-gaze-origin-signal.

The eye tracking system may be configured to:
set the right-eye-weighting to zero if the right-eye-gaze-origin-signal is located outside an expected-right-eye-origin-region; and/or
set the left-eye-weighting to zero if the left-eye-gaze-origin-signal is located outside an expected-left-eye-origin-region.

The eye tracking system may further comprise a buffer configured to store a plurality of pupil-signals that correspond to the most recent right-eye-images and the most recent left-eye-images. The eye tracking system may be configured to: calculate a right-eye-pupil-variation for the pupil-signals of the right-eye-images that are stored in the buffer; and calculate a left-eye-pupil-variation for the pupil-signals of the left-eye-images that are stored in the buffer.

The eye tracking system may be configured to update the right-eye-pupil-variation and the left-eye-pupil-variation with a moving average filter as the contents of the buffer are updated.

According to a further aspect, there is provided a head-mounted device comprising any eye tracking system disclosed herein.

According to a further aspect, there is provided a method of weighting right-eye-images and left-eye-images for calculating a combined-gaze-signal, the method comprising:
receiving a plurality of right-eye-images of a right eye of the user;

receiving a plurality of left-eye-images of a left eye of the user, each left-eye-image corresponding to a right-eye-image in the plurality of right-eye-images;

detecting a pupil and determining an associated pupil-signal, for each of the plurality of right-eye-images and each of the plurality of left-eye-images;

calculating a right-eye-pupil-variation of the pupil-signals for the plurality of right-eye-images and a left-eye-pupil-variation of the pupil-signals for the plurality of left-eye-images;

determining a right-eye-weighting based on the right-eye-pupil-variation and a left-eye-weighting based on the left-eye-pupil-variation; and for one or more right-eye-images and one or more corresponding left-eye-images:
 determining a right-eye-gaze-signal based on the right-eye-image and a left-eye-gaze-signal based on the corresponding left-eye-image; and
 calculating a combined-gaze-signal from a weighted sum of the right-eye-gaze-signal and the left-eye-gaze-signal using the right-eye-weighting and the left-eye-weighting.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

There is also disclosed an eye tracking system configured to:
 receive a plurality of right-eye-images of a right eye of the user;
 receive a plurality of left-eye-images of a left eye of the user, each left-eye-image corresponding to a right-eye-image in the plurality of right-eye-images;
 detect an image-feature and determine an associated eye-feature-signal, for each of the plurality of right-eye-images and each of the plurality of left-eye-images;
 calculate a right-eye-feature-variation of the eye-feature-signals for the plurality of right-eye-images and a left-eye-feature-variation of the eye-feature-signals for the plurality of left-eye-images;
 determine a right-eye-weighting based on the right-eye-feature-variation and a left-eye-weighting based on the left-eye-feature-variation.
 for one or more right-eye-images and one or more corresponding left-eye-images:
  determine a right-eye-gaze-signal based on the right-eye-image and a left-eye-gaze-signal based on the corresponding left-eye-image; and
  calculate a combined-gaze-signal from a weighted sum of the right-eye-gaze-signal and the left-eye-gaze-signal using the right-eye-weighting and the left-eye-weighting.

The eye-feature-signal may be a pupil-signal or a cornea-signal, or any other eye-feature-signal disclosed herein. The image feature may be a pupil or a glint.

BRIEF DESCRIPTION OF THE DRAWINGS

There now follows, by way of example only, a detailed description of embodiments of the invention with reference to the following figures, in which.

All the figures are schematic and generally only show parts which are necessary in order to elucidate the respective embodiments, whereas other parts may be omitted or merely suggested.

DETAILED DESCRIPTION

Figure 1:
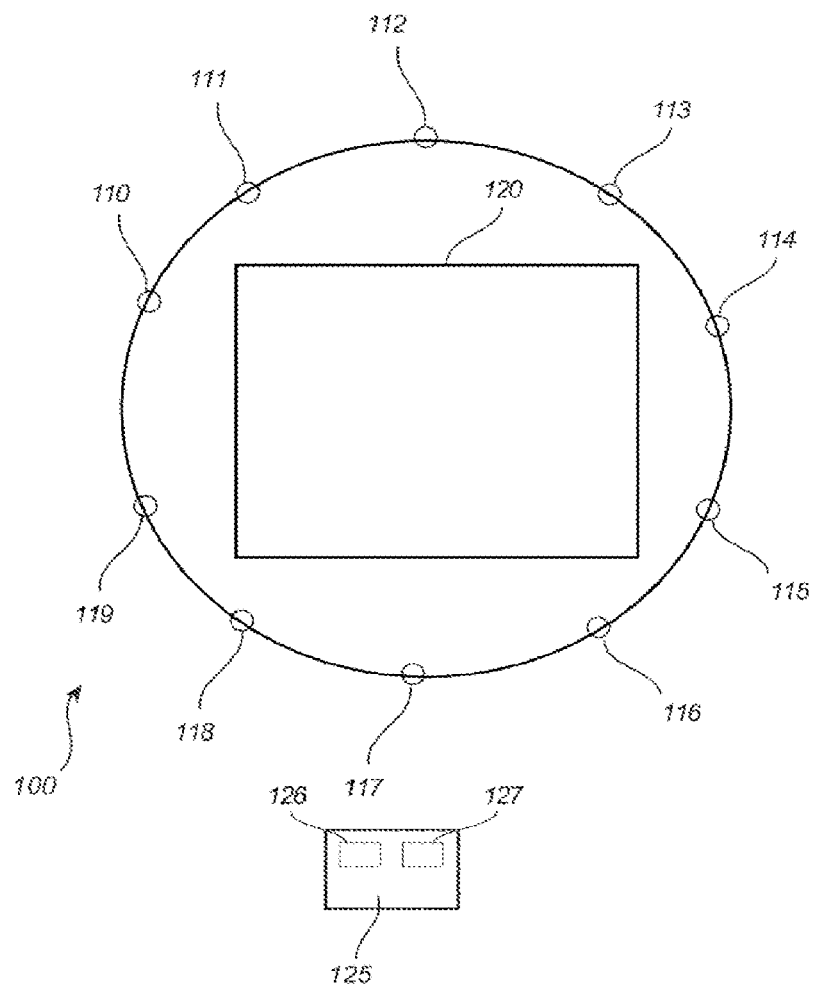
FIG. 1 shows a schematic view of an eye tracking system which may be used to capture a sequence of images that can be used by example embodiments.

FIG. 1 shows a simplified view of an eye tracking system 100 (which may also be referred to as a gaze tracking system) in a head-mounted device in the form of a virtual or augmented reality (VR or AR) device or VR or AR glasses or anything related, such as extended reality (XR) or mixed reality (MR) headsets. The system 100 comprises an image sensor 120 (e.g. a camera) for capturing images of the eyes of the user. The system may optionally include one or more illuminators 110-119 for illuminating the eyes of a user, which may for example be light emitting diodes emitting light in the infrared frequency band, or in the near infrared frequency band and which may be physically arranged in a variety of configurations. The image sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor may be capable of converting light into digital signals. In one or more examples, it could be an Infrared image sensor or IR image sensor, an RGB sensor, an RGBW sensor or an RGB or RGBW sensor with IR filter.

The eye tracking system 100 may comprise circuitry or one or more controllers 125, for example including a receiver 126 and processing circuitry 127, for receiving and processing the images captured by the image sensor 120. The circuitry 125 may for example be connected to the image sensor 120 and the optional one or more illuminators 110-119 via a wired or a wireless connection and be co-located with the image sensor 120 and the one or more illuminators 110-119 or located at a distance, e.g. in a different device. In another example, the circuitry 125 may be provided in one or more stacked layers below the light sensitive surface of the light sensor 120.

The eye tracking system 100 may include a display (not shown) for presenting information and/or visual stimuli to the user. The display may comprise a VR display which presents imagery and substantially blocks the user's view of the real-world or an AR display which presents imagery that is to be perceived as overlaid over the user's view of the real-world.

The location of the image sensor 120 for one eye in such a system 100 is generally away from the line of sight for the user in order not to obscure the display for that eye. This configuration may be, for example, enabled by means of so-called hot mirrors which reflect a portion of the light and allows the rest of the light to pass, e.g. infrared light is reflected, and visible light is allowed to pass.

While in the above example the images of the user's eye are captured by a head-mounted image sensor 120, in other examples the images may be captured by an image sensor that is not head-mounted. Such a non-head-mounted system may be referred to as a remote system.

In an eye tracking system, a gaze signal can be computed per each eye of the user (left and right). The quality of these gaze signals can be reduced by disturbances in the input images (such as image noise) and by incorrect algorithm behavior (such as incorrect predictions). A goal of the eye tracking system is to deliver a gaze signal that is as good as possible, both in terms of accuracy (bias error) and precision (variance error). For many applications it can be sufficient to deliver only one gaze signal per time instance, rather than both the gaze of the left and right eyes individually. Further, the combined gaze signal can be provided in combination with the left and right signals. Such a gaze signal can be referred to as a combined gaze signal.

Figure 2:
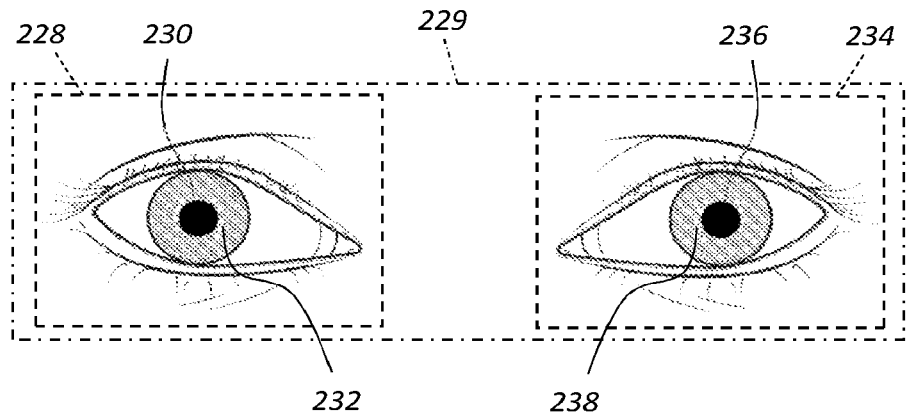
FIG. 2 shows an example image of a pair of eyes.

FIG. 2 shows a simplified example of an image 229 of a pair of eyes, captured by an eye tracking system such as the system of FIG. 1. The image 229 can be considered as including a right-eye-image 228, of a person's right eye, and a left-eye-image 234, of the person's left eye. In this example the right-eye-image 228 and the left-eye-image 234 are both parts of a larger image of both of the person's eyes. In other examples, separate image sensors may be used to acquire the right-eye-image 228 and the left-eye-image 234. The system may employ image processing (such as digital image processing) for extracting features in the image. The system may for example identify the location of the pupil 230, 236 in the one or more images captured by the image sensor. The system may determine the location of the pupil 230, 236 using a pupil detection process. The system may also identify corneal reflections 232, 238 located in close proximity to the pupil 230, 236. The system may estimate a corneal centre or eye ball centre based on the corneal reflections 232, 238.

Figure 3:
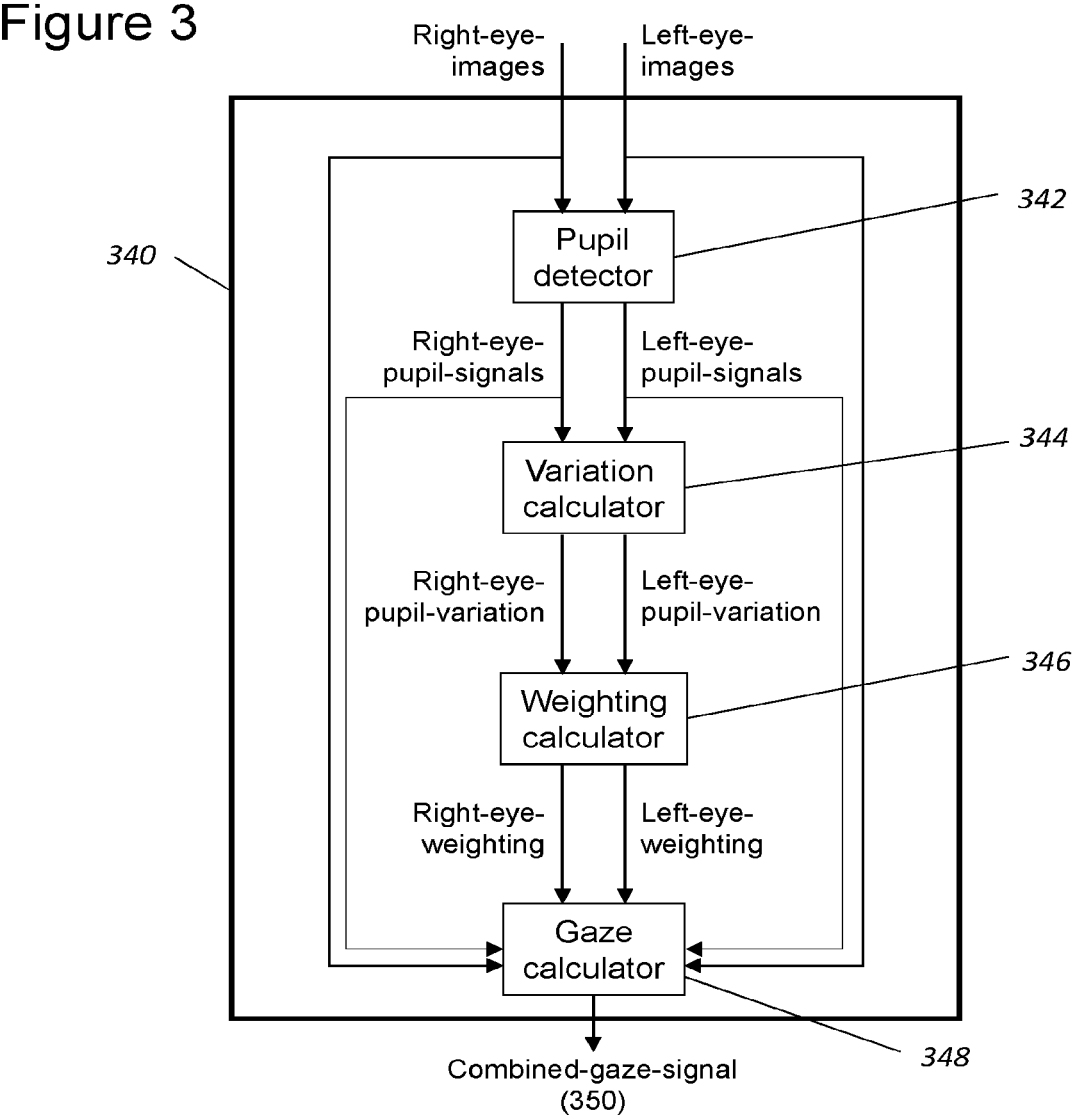
FIG. 3 shows an example of an eye tracking system according to an embodiment of the present disclosure.

FIG. 3 shows an example of an eye tracking system 340 according to an embodiment of the present disclosure. The functionality that is illustrated in FIG. 3 may be provided by one or more controllers. The eye tracking system may be part of, or associated with, a head-mounted device or a remote system. The eye tracking system 340 calculates a combined-gaze-signal 350 that is representative of a person's gaze. The combined-gaze-signal 350 can include one or more user-gaze-parameters such as a combined-gaze-origin-signal and/or a combined-gaze-direction-signal. It will be appreciated that the various modules of the eye tracking system 340 that are described below may be embodied in software or hardware.

The eye tracking system 340 receives a plurality of right-eye images of a right eye of a user, and a plurality of left-eye-images of a left eye of a user. The plurality of right- and left-eye-images may be provided as sequences of images of the eye, either one at a time or together as a batch of images. The plurality of images may be temporal sequences of images, whereby the images in a sequence are spaced apart from each other in time.

As discussed above, the right-eye-images and the left-eye-images may be parts of a larger common image that was acquired by a single camera, or may be acquired by separate cameras. The left-eye-images correspond to the right-eye-images in the plurality of right-eye-images. That is, a left-eye-image may have a corresponding right-eye-image for the same person. The corresponding left- and right-eye images may have been acquired at the same instant in time (for instance as part of the same original image of both eyes), or at least while the person's eyes are expected to be looking in the same direction (for example because there is a stationary stimulus being displayed to the user). Therefore, it will be appreciated that the left- and right-eye-images do not necessarily have to be in sync with each other because they do not have to be acquired at the same instant in time. In some applications the left- and right-eye-images can be interlaced in time, yet still be considered as corresponding to each other.

The eye tracking system 340 includes a pupil detector 342 that detects a pupil in an image and determines an associated pupil-signal. In this example the pupil detector 342 determines a right-eye-pupil-signal for each of the plurality of right-eye-images, and it also determines a left-eye-pupil-signal for each of the plurality of left-eye-images. The pupil-signals can include one or multiple signals describing position and shape of the pupil, such as a pupil-position and/or a pupil-radius. In this way, the pupil-signals can include data that relates to the pupil position and/or the pupil radius of the eye. Any known pupil detection methods can be used by the pupil detector 342 to determine the left- and right-eye-pupil-signals. For example the pupil detector 342 may apply a detection and fitting algorithm. The pupil detector 342 may perform any known pupil-detection process.

Due to the size of the input space that is represented by the left- and right-eye-images, and also the likelihood of unexpected disturbances, such pupil detection algorithms can have flaws, for example falsely detected features. The subsequent processing that is performed by the eye tracking system 340 of FIG. 3 can mitigate against these flaws and enable an improved combined-gaze-signal 350 to be calculated. This can especially be the case for calculating a combined-gaze-direction-signal. Even a small offset in a detected pupil position can have a significant effect on the quality of the combined-gaze-direction-signal.

The eye tracking system 340 includes a variation calculator 344 that calculates a right-eye-pupil-variation of the right-eye-pupil-signals for the plurality of right-eye-images, and calculates a left-eye-pupil-variation of the left-eye-pupil-signals for the plurality of left-eye-images. As will be discussed in detail below, these variations can relate to the degree of change in the pupil-signals over a period of time (as represented by the plurality of images). The variation may be represented by a statistical dispersion, such as one or more of the following: standard deviation, average absolute deviation, interquartile range (IQR), range, mean absolute difference, median absolute deviation, average absolute deviation, distance standard deviation, coefficient of variation, quartile coefficient of dispersion, relative mean difference, entropy, variance, and variance-to-mean ratio, as non-limiting examples.

The eye tracking system 340 includes a weighting calculator 346 that determines a right-eye-weighting based on the right-eye-pupil-variation, and also determines a left-eye-weighting based on the left-eye-pupil-variation. The weighting calculator 346 can apply an equation to the received variations to determine the associated weightings, or can use a database/look-up table to determine the associated weightings. The eye tracking system 340 can determine the right-eye-weighting based on a non-linear function that relates the right-eye-pupil-variation to the right-eye-weighting, and can also determine the left-eye-weighting based on a non-linear function that relates the left-eye-pupil-variation to the left-eye-weighting. The non-linear function can be a sigmoid function or a rectified linear unit function, as non-limiting examples. The function can define an inverse relationship between the weighting and the variation. In this way, as the value of the variation increases, the value for the weighting decreases.

In this example the weighting calculator 346 applies a sigmoid function to a received variation to determine the weighting. Optionally, the weighting calculator 346 normalises the determined right-eye-weighting and the left-eye-weighting such that the sum of the right-eye-weighting and the left-eye-weighting is 1.

Figure 4:
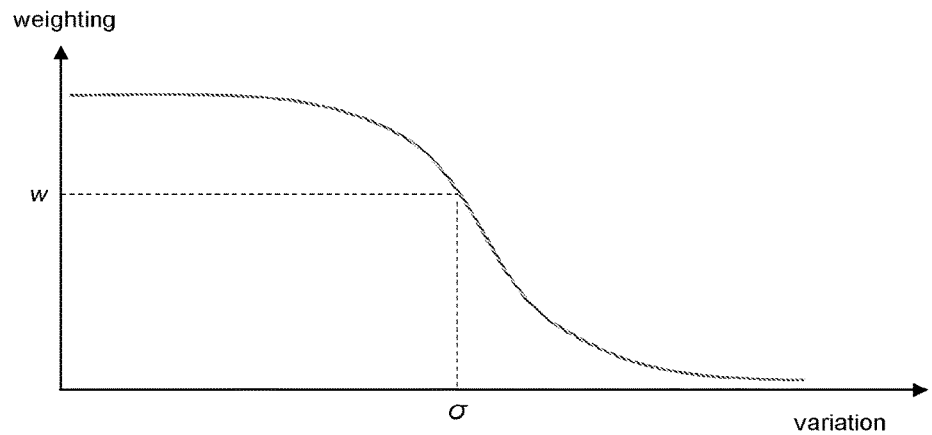
FIG. 4 shows graphically an example of a sigmoid function.

FIG. 4 shows graphically an example of a sigmoid function that can be applied to a received variation (such as a standard deviation a) as part of determining an appropriate weighting w.

Returning to FIG. 3, the eye tracking system 340 includes a gaze calculator 348 which, for one or more right-eye-images and one or more corresponding left-eye-images, calculates the combined-gaze-signal 350. As indicated above, the combined-gaze-signal 350 can include a combined-gaze-origin-signal and/or a combined-gaze-direction-signal.

The gaze calculator 348 can determine a right-eye-gaze-signal based on the right-eye-image. The gaze calculator 348 can also determine a left-eye-gaze-signal based on the corresponding left-eye-image. The gaze calculator 348 can determine such gaze-signals in any way that is known in the art. For example using the processing described in U.S. Pat. No. 7,572,008 B2, or as described in "General Theory of Remote Gaze Estimation Using the Pupil Center and Corneal Reflections" by Elias Daniel Guestrin and Moshe Eizenman (IEEE TRANSACTIONS ON BIOMEDICAL ENGINEERING, VOL. 53, NO. 6, JUNE 2006).

In some examples the gaze calculator 348 may determine a right-eye-gaze-origin-signal by detecting one or more glints in the right-eye-image, and calculating the right-eye-gaze-origin-signal based on the one or more glints. Similarly, the gaze calculator 348 may determine a left-eye-gaze-origin-signal by detecting one or more glints in the left-eye-image and then calculating the left-eye-gaze-origin-signal based on the one or more glints. Detecting and processing glints in this way is well-known in the art.

The gaze-calculator 348 can determine or receive a right-eye-pupil-position of the detected pupil in the right-eye-image; and calculate a right-eye-gaze-direction-signal based on the right-eye-gaze-origin-signal and the pupil-position. Similarly, the gaze-calculator 348 can determine or receive a left-eye-pupil-position of the detected pupil in the left-eye-image; and calculate the left-eye-gaze-direction-signal based on the left-eye-gaze-origin-signal and the pupil-position.

The gaze calculator 348 can then calculate the combined-gaze-signal 350 from a weighted sum of the right-eye-gaze-signal and the left-eye-gaze-signal using the right-eye-weighting and the left-eye-weighting. In this example, the gaze calculator 348 calculates a right-eye-gaze-origin-signal ($O_R$), a left-eye-gaze-origin-signal ($O_L$), a right-eye-gaze-direction-signal ($v_R$), and a left-eye-gaze-direction-signal ($v_L$). The gaze calculator 348 may then determine a combined-gaze-origin-signal ($O_C$) and a combined-gaze-direction-signal ($v_C$) as follows:

$$O_C = w_L * O_L + w_R * O_R$$

$$v_C = w_L * v_L + w_R * v_R$$

where:
$w_L$ is the left-eye-weighting; and
$w_R$ is the right-eye-weighting.

Advantageously, such a combined-gaze-signal 350 can have an improved accuracy and/or precision compared to other solutions using the left and right signals. Accuracy can be a measure of statistical bias (or systemic errors), and can be represented by the estimated gaze points being well aligned with a true gaze point of the person. Precision can be a measure of statistical variability, or how close together estimated gaze points are aggregated/clustered. The position of the estimated gaze points relative to the true gaze point of the person is irrelevant to the precision of the combined-gaze-signal 350. It has been found that a particularly good combined-gaze-signal 350 can be achieved by using the variation in the pupil-signals to determine weightings. In particular, the pupil-signals can be considered as intermediate signals in the determination of the combined-gaze-signal. It has thus been found that calculating the weightings based on the (intermediate) pupil-signals can result in particularly good improvements to the combined-gaze-signal. This can result in an improved combined-gaze-signal when compared with calculating a variation in the left- and right-gaze-signals themselves, at least in some applications.

Figure 5:
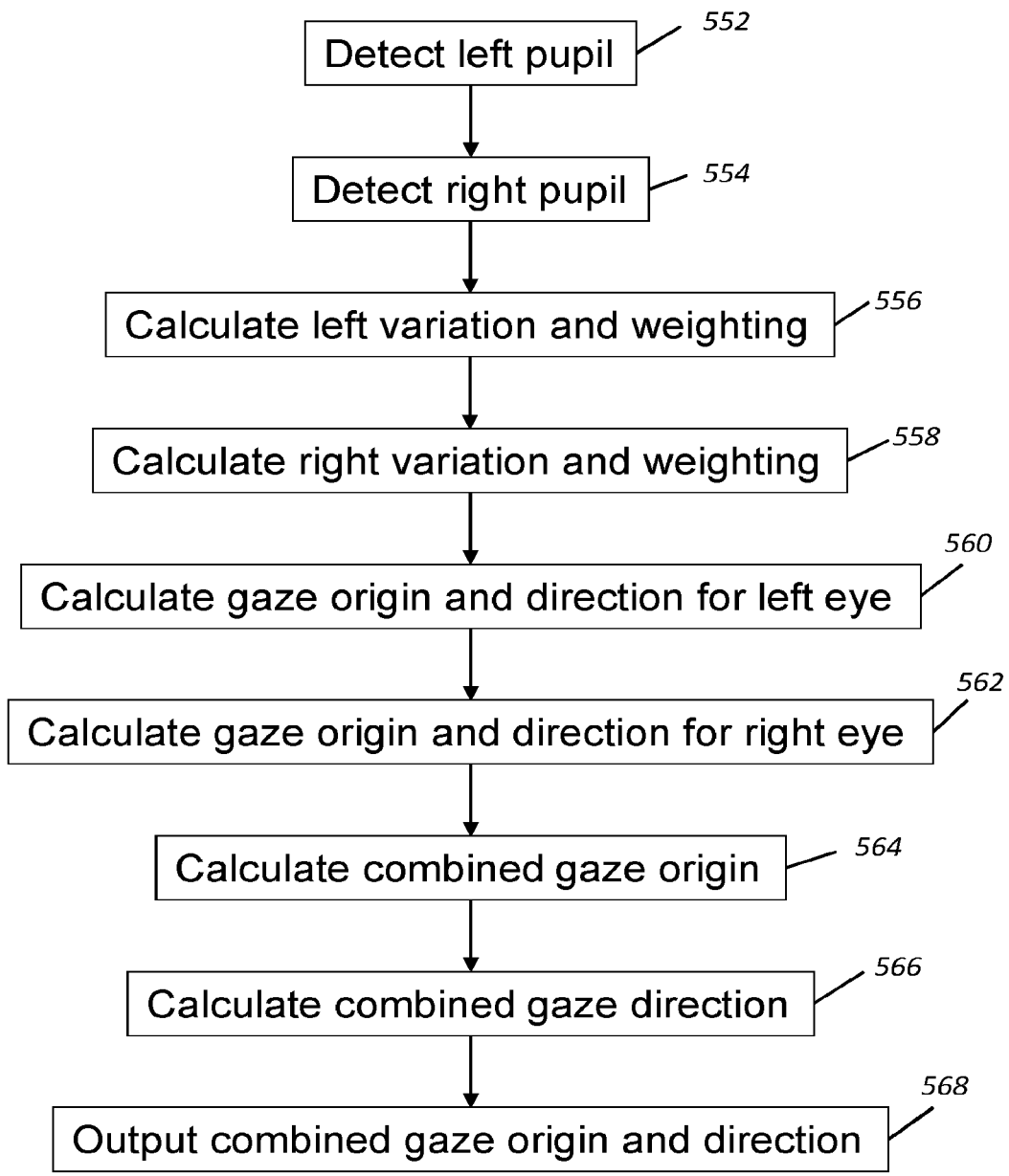
FIG. 5 illustrates schematically a computer-implemented method according to an embodiment of the present disclosure.

FIG. 5 illustrates schematically a computer-implemented method according to an embodiment of the present disclosure.

At step 552, the method detects the pupil $P_L^i = (x_L^i, y_L^i)$ in one or more images i=t, ..., t−N of the left eye. Where $x_L^i$ represents the pupil-position of the left eye in image i, and $y_L^i$ represents the pupil-radius of the left eye in image i. At step 554, the method detects the pupil $P_R^i = (x_R^i, y_R^i)$ in one or more images i=t, ..., t−N of the right eye. Where $x_R^i$ represents the pupil-position of the right eye in image i, and $y_R^i$ represents the pupil-radius of the right eye in image i. As discussed above, these images can be provided as a series of images over time.

The pupil matrices $P_L^i$ and $P_R^i$ represent one way of storing the history of pupil detections in a plurality of images. In some examples, a batch of N images can be processed at steps 552 and 554 in order to generate the matrices $P_L^i$ and $P_R^i$ before the method moves on to subsequent processing steps. In some examples, method steps 552 and 554 may each process received images i one at a time, and include new data $(x_L^i, y_L^i)$ $(x_R^i, y_R^i)$ in the matrices ($P_L^i$, $P_R^i$) for each image. When the number of data entries in the matrices reach a predetermined number (N), the method will replace the oldest data entry in the matrix with the data $(x_L^i, y_L^i)$ $(x_R^i, y_R^i)$ for the most recent image. This is one way of restricting the size of the data sets in the matrices such that they store data that represents the N most recent images.

In this way, the method can utilise a buffer that stores a plurality of pupil-signals that are derived from the most recent right-eye-images and the most recent left-eye-images. The buffer can store received pupil-signals on a first-in-first-out basis such that only the most recent pupil-signals are stored in the buffer. In some examples, two separate buffers may be used—one for the pupil-signals that relate to the right-eye-images, and another for the pupil-signals that relate to the left-eye-images. At step 558, the method can then calculate the right-eye-pupil-variation for the pupil-signals of the right-eye-images that are stored in the buffer. Similarly, at step 556, the method can then calculate the left-eye-pupil-variation for the pupil-signals of the left-eye-images that are stored in the buffer. As discussed above, this can involve performing a statistical operation on the data $(x_L^i, y_L^i)$ $(x_R^i, y_R^i)$ that is stored in the buffer.

Alternatively, the method can utilise a buffer that stores the plurality of right-eye-images and the plurality of left-eye-images. The plurality of right-eye-images and the plurality of left-eye-images can be buffered portions of corresponding sequences of right-eye-images and left-eye-images. The buffered portions can be continuously updated with new images received by the eye tracking system on a first-in-first-out basis. Steps 552 and 554 can then be used to detect the pupils in the images that are stored in the buffer.

In examples where a buffer is used, the method can update the right-eye-pupil-variation and the left-eye-pupil-variation with a moving average filter as the contents of the buffer are updated.

Also at step 556, the method computes a weighting $w_L$ (which may also be referred to as a confidence level) for the left eye based on the variance of the pupil position $(x_L^i)$ in the images captured of the left eye. At step 558, the method computes a weighting $w_R$ (which again may be referred to as a confidence level) for the right eye based on the variance of the pupil position $(x_R^i)$ in the images captured of the right eye. In other embodiments, the method can compute the weightings $w_L$, $w_R$ based on the variance of the pupil radiuses $(y_L^i, y_R^i)$ of the respective eyes. This can be instead of, or in addition to, the variance of the pupil positions $(x_L^i, x_R^i)$. As discussed above, the method can compute the weighting by applying an inverse function to the appropriate variance values. Also, the weightings $w_L$ and $w_R$ can be normalised so that they sum to 1.

At step 560, the method computes the gaze origin $(O_L)$ and gaze direction $(v_L)$ for the left eye. At step 562, the method computes the gaze origin $(O_R)$ and gaze direction $(v_R)$ for the right eye.

At step 564, the method creates a combined gaze origin $(O_C)$ as a weighted sum of the left and right gaze origins computed for image i: $O_C = w_L * O_L + w_R * O_R$. At step 566, the method creates a combined gaze direction $(v_C)$ as a weighted sum of the left and right gaze directions computed for image i: $v_C = w_L * v_L + w_R * v_R$.

At step 568, the method outputs a combined-gaze-signal that includes the combined gaze origin $(O_C)$ and the combined gaze direction $(v_C)$.

It will be appreciated that various ones of the method steps illustrated in FIG. 5 do not need to be performed in the order shown. For instance, the processing of the signals that relate to the left eye and the right eye can be performed in parallel.

The method of FIG. 5 can advantageously take into account the possibility of unexpected disturbances and flaws in the pupil detection by computing the weightings (confidence levels) for each eyes' gaze signal. This can be considered as foreseeing the sub-optimal performance of the pupil detection, combining it with physical limitations of the human eye, and assuming (at least somewhat) correlated movements between a user's left and right eyes. This can be achieved by measuring the spread in position (variance) of the detected pupil for each eye and relating them to each other (for instance by normalising the weightings so that they sum to 1).

Figure 6:
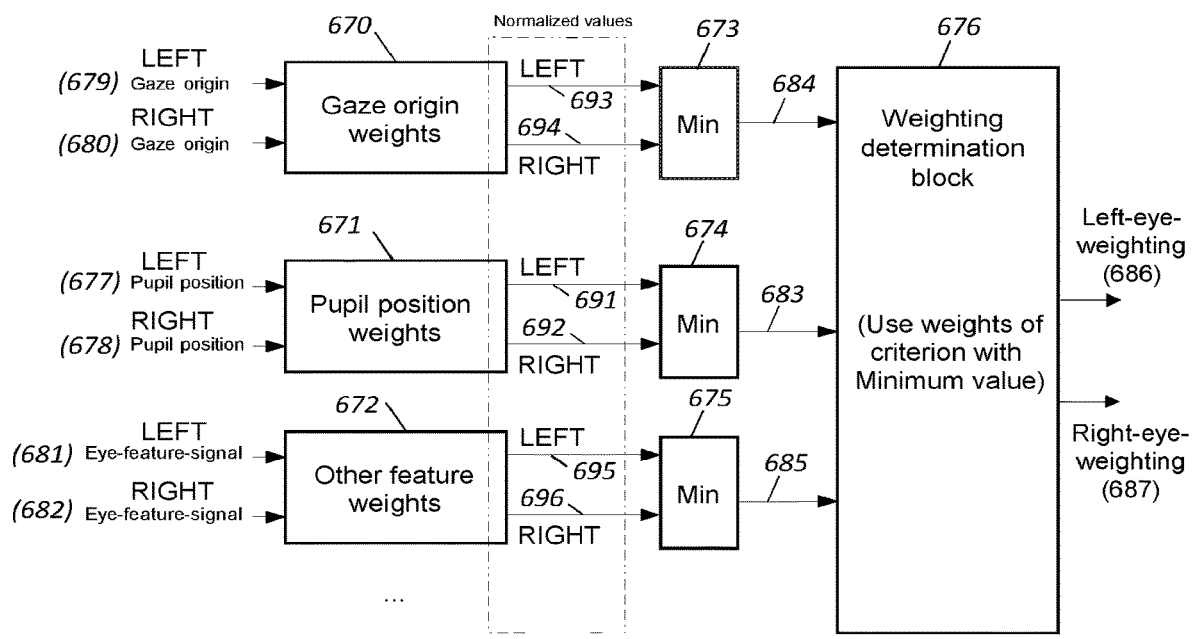
FIG. 6 shows modules of an eye tracking system according to another embodiment of the present disclosure.

FIG. 6 shows modules of an eye tracking system according to another embodiment of the present disclosure. In this embodiment the eye tracking system receives one or more eye-feature-signals 681, 682 (in addition to the pupil-signals that are discussed above), and calculates associated feature-variations for the plurality of left- and right-eye-images. The eye tracking system can then determine the right-eye-weighting 687 and the left-eye-weighting 686 based on the pupil-variations (that are calculated using the pupil-signals 677, 678) and the feature-variations (that are calculated using the eye-feature-signals 681, 682). In this way, additional parameters (eye-features) can be used to determine the weightings. This can result in a combined-gaze-signal that is even further improved. Further details are provided below.

FIG. 6 shows a pupil-positions-weight-module 671, which receives a plurality of left-eye-pupil-signals 677 and a plurality of right-eye-pupil-signals 678. These signals can be calculated by a pupil detector module (not shown) based on a plurality of left-eye-images and right-eye-images respectively. In this example the left-eye-pupil-signals 677 are left-eye-pupil-position-signals, and the right-eye-pupil-signals 678 are right eye-pupil-position-signals. The pupil-positions-weight-module 671 calculates a right-eye-pupil-weighting and a left-eye-pupil-weighting which are normalised such they sum to 1, in the same way as discussed above. That is, the right-eye-pupil-weighting and the left-eye-pupil-weighting are based on a calculated right-eye-pupil-variation and a calculated left-eye-pupil-variation. In this way, the pupil-positions-weight-module 671 can determine a pupil-weighting-pair comprising a right-eye-pupil-weighting 692 (based on the right-eye-pupil-variation) and a left-eye-pupil-weighting 691 (based on the left-eye-pupil-variation). The right-eye-pupil-weighting 692 and the left-eye-pupil-weighting 691 are processed by a minimum function block 674, and the minimum function block 674 provides a minimum-normalised-pupil-weight 683 to a weighting-determination-block 676. The minimum-normalised-pupil-weight 683 represents the lowest value of the pupil-weighting-pair. For example: if the pupil-weighting-pair consisted of values of 0.7 and 0.3, then the minimum-normalised-pupil-weight 683 would be 0.3.

FIG. 6 also includes a gaze-origin-weight-module 670, which receives a plurality of left-eye-gaze-origin-signals 679 and a plurality of right-eye-gaze-origin-signals 680. These signals can be calculated by a gaze calculator module (not shown) based on a plurality of left-eye-images and right-eye-images respectively. The gaze-origin-weight-module 670 calculates a right-eye-gaze-origin-weighting 694 and a left-eye-gaze-origin-weighting 693, which are normalised such they sum to 1, in the same way as discussed above. In this way, the gaze-origin-weight-module 670 can determine a gaze-origin-weighting-pair comprising a right-eye-gaze-origin-weighting 694 (based on a right-eye-gaze-origin-variation) and a left-eye-gaze-origin-weighting 693 (based on a left-eye-gaze-origin-variation). The right-eye-gaze-origin-weighting and the left-eye-gaze-origin-weighting are processed by a minimum function block 673, and the minimum function block 673 provides a minimum-normalised-gaze-origin-weight 684 to the weighting-determination-block 676. The minimum-normalised-gaze-origin-weight 684 represents the lowest value of the gaze-origin-weighting-pair.

FIG. 6 also shows a more generic eye-feature-weight-module 672. Examples of various types of eye-features are provided below. The eye-feature-weight-module 672 receives a plurality of left-eye-feature-signals 681 and a plurality of right-eye-feature-signals 682. The left- and right-eye-feature-signals 681, 682 can be provided by another module of the eye tracking system (not shown) that processes a plurality of left-eye-images and a plurality of right-eye-images to respectively determine the left- and the right-eye-feature-signals 681, 682.

The eye-feature-weight-module 672 can calculate a right-eye-feature-variation based on the right-eye-feature-signals 682 for the plurality of right-eye-images. The eye-feature-weight-module 672 can also calculate a corresponding left-eye-feature-variation based on the left-eye-feature-signals 681 for the plurality of left-eye-images. The eye-feature-weight-module 672 can then determine a feature-weighting-pair comprising a right-eye-feature-weighting 696 (based on the right-eye-feature-variation) and a left-eye-feature-weighting 695 (based on the left-eye-feature-variation). In the same way as described above with respect to pupil-variations, the eye-feature-weight-module 672 may apply a non-linear function to the left-eye-feature-variation and the right-eye-feature-variation, and then normalise the feature-weighting-pair such that they sum to 1, in order to determine the left-eye-feature-weighting 695 and the right-eye-feature-weighting 696.

The right-eye-feature-weighting 696 and the left-eye-feature-weighting 695 are processed by a minimum function block 675, and the minimum function block 675 provides a minimum-normalised-eye-feature-weight 685 to the weighting-determination-block 676. The minimum-normalised-eye-feature-weight 685 represents the lowest value of the feature-weighting-pair.

The eye tracking system may include one or more eye-feature-weight-modules 672, that respectively process eye-feature-signals that represent one or more of:
  pupil position (in the same way as pupil-positions-weight-module 671);
  pupil radius;
  gaze origin (in the same way as gaze-origin-weight-module. That is, the gaze-origin-signals 679, 680 are examples of eye-feature-signals);
  cornea position;
  iris position;
  iris radius;
  eye-corner position; and
  a number of matched illuminator-glint pairs. An example system for matching illuminator-glint pairs is described in WO 2019/185136 A1.

In some examples, an eye-feature-signal may be provided by any image based/computer vision method or machine learning based algorithm. For instance, "Real-Time Detection and Measurement of Eye Features from Color Images" by Diana Borza et al (Sensors (Basel) 2016 July; 16(7): 1105. Published online 2016 Jul. 16. doi: 10.3390/s16071105) describes various eye features, including some that relate to the iris.

The weighting-determination-block 676 can then determine a minimum-normalised-weight of all the normalised-weights in the normalised pupil-weighting-pair (provided by the pupil-positions-weight-module 671 in this example) and the one or more normalised eye-feature-weighting-pairs (provided by the gaze-origin-weight-module 671 and the eye-feature-weight-module 672 in this example). The weighting-determination-block 676 then determines the left-eye-weighting 686 and the right-eye-weighting 687 as the normalised pupil-weighting-pair, the normalised gaze-origin-weighting-pair, or the normalised-feature-weighting-pair that contains the minimum-normalised-weight.

As a numerical example, if: the minimum-normalised-gaze-origin-weight 684 has a value of 0.2; the minimum-normalised-pupil-weight 683 has a value of 0.5, and the minimum-normalised-eye-feature-weight 685 has a value of 0.25; then the minimum-normalised-weight would be 0.2. The weighting-determination-block 676 would then determine the left-eye-weighting 686 and the right-eye-weighting 687 as having values that match the right-eye-gaze-origin-weighting and the left-eye-gaze-origin-weighting (as determined by the gaze-origin-weight-module 670) because it is this weighting pair that has the minimum value of 0.2.

It will be appreciated that the same result can be achieved if the minimum functions 673, 674, 675 and the weighting-determination-block 676 all identified maximum values of the signals that they process, instead of minimum values. This is because the sum of a normalised weighting pair will always be 1, and therefore identifying the pair with the highest weighting will also identify the pair with the lowest weighting.

In this way, the weighting-determination-block 676 can determine the right-eye-weighting 687 and the left-eye-weighting 686 based on a right-eye-pupil-variation, a left-eye-pupil-variation, one or more right-eye-feature-variations and one or more left-eye-feature-variations. The right-eye-weighting 687 and the left-eye-weighting 686 can then be used by a gaze calculator, such as the one of FIG. 3, to determine a combined-gaze-signal.

The modules of FIG. 6 can advantageously identify which weighting-pair of a plurality of a weighting-pairs is likely to provide the best combined-gaze-signal. This is because a low weighting can be used to calculate a combined-gaze-signal from left- or right-eye-images when a pupil-signal/eye-feature that is calculated from those left- or right-eye-images is particularly poor. In this way, those poor images have a reduced effect on the calculated combined-gaze-signal.

In one or more of the examples disclosed herein, the eye tracking system can set a right-eye-weighting to zero if the right-eye-gaze-origin-signal is located outside an expected-right-eye-origin-region. In the same way, the eye tracking system may set the left-eye-weighting to zero if the left-eye-gaze-origin-signal is located outside an expected-left-eye-origin-region. The expected-right-eye-origin-region and the expected-left-eye-origin-region may define two- or three-dimensional regions of space in which the gaze origin is expected to be. These may be predefined based on a known physical relationship between an image sensor in the eye tracking system and the expected location of the person's eyes. Such regions can be especially well-defined in head-mounted display systems. If a calculated gaze-origin-signal is outside of its associated expected-origin-region then this can be interpreted by the eye tracking system as an indicator that signals derived from the associated eye-images are unreliable and therefore should not be used when calculating a combined-gaze-signal.

The systems disclosed herein, including those of FIGS. 3 and 6, may be modified such that they do not necessarily need to detect a pupil in an eye-image. Nor do they necessarily need to determine corresponding pupil-signals. Instead, an eye tracking system may detect an image-feature and determine an associated eye-feature-signal, for each of the plurality of right-eye-images and each of the plurality of left-eye-images. The eye tracking system can then calculate a right-eye-feature-variation of the eye-feature-signals for the plurality of right-eye-images and a left-eye-feature-variation of the eye-feature-signals for the plurality of left-eye-images, before determining a right-eye-weighting based on the right-eye-feature-variation and a left-eye-weighting based on the left-eye-feature-variation. The eye tracking system can then calculate a combined-gaze-signal using the right-eye-weighting and the left-eye-weighting in the same way as described above. The eye-feature-signal can be a pupil-signal a cornea-signal, or any other suitable signal disclosed herein. The image feature may be a pupil or a glint, for example.

What is claimed is:

1. An eye tracking system configured to perform operations comprising:
   receiving a plurality of right eye images of a right eye of a user;
   receiving a plurality of left eye images of a left eye of a user, each left eye image in the plurality of left eye images corresponding to a respective right eye image in the plurality of right eye images;
   receiving an eye feature signal representing a detected image feature for each of the plurality of right eye images and each of the plurality of left eye images;
   calculating a right eye feature variation of the eye feature signals for the plurality of right eye images and a left eye feature variation of the eye feature signals for the plurality of left eye images;
   determining a right eye weighting and a left eye weighting based on the right eye feature variation and the left eye feature variation, respectively; and
   for one or more right eye images and one or more corresponding left eye images: determining at least one right eye gaze signal based on the right eye image and at least one left eye gaze signal based on the corresponding left eye image; and
   calculating a combined gaze signal from a weighted sum of the right eye gaze signal and the left eye gaze signal using the right eye weighting and the left eye weighting.

2. The eye tracking system of claim 1, wherein the eye feature signal comprises a signal representing detected pupil features in the eye image or a signal representing detected cornea features in the eye image.

3. The eye tracking system of claim 1, wherein:
   the right eye gaze signal comprises a right eye gaze origin signal;
   the left eye gaze signal comprises a left eye gaze origin signal; and the combined gaze signal comprises a combined gaze origin signal.

4. The eye tracking system of claim 3, the operations further comprising:
   determining a right eye gaze origin signal by detecting one or more glints in the right eye image and calculating the right eye gaze origin signal based on the one or more glints; and
   determining a left eye gaze origin signal by detecting one or more glints in the left eye image and calculating the left eye gaze origin signal based on the one or more glints.

5. The eye tracking system of claim 3, the operations further comprising
   setting the right eye weighting to zero if the right eye gaze origin signal is located outside an expected right eye origin region; and
   setting the left eye weighting to zero if the left eye gaze origin signal is located outside an expected left eye origin region.

6. The eye tracking system of claim 1, wherein:
   the right eye gaze signal comprises a right eye gaze direction signal;
   the left eye gaze signal comprises a left eye gaze direction signal; and the combined gaze signal comprises a combined gaze direction signal.

7. The eye tracking system of claim 6, the operations further comprising:
   determining a right eye gaze direction signal by:
      detecting one or more glints in the right eye image;
      calculating the right eye gaze origin signal based on the one or more glints; detecting a pupil in the right eye image;
      determining a right eye pupil position of the detected pupil in the right eye image; and
      calculating a right eye gaze direction signal based on the right eye gaze origin signal and the right eye pupil position; and
   determine a left eye gaze direction signal by:
      detecting one or more glints in the left eye image;
      calculating the left eye gaze origin signal based on the one or more glints;
      detecting a pupil in the left eye image;
      determining a left eye pupil position of the detected pupil in the left eye image; and
      calculating a left eye gaze direction signal based on the left eye gaze origin signal and the left eye pupil position.

8. The eye tracking system of claim 6, the operations further comprising: setting the right eye weighting to zero if the right eye gaze origin signal is located outside an expected right eye origin region; and
   setting the left eye weighting to zero if the left eye gaze origin signal is located outside an expected left eye origin region.

9. The eye tracking system of claim 1, wherein:
   a combined gaze direction signal comprises a right eye gaze direction signal and a left eye gaze direction signal;
   a combined gaze origin signal comprises a right eye gaze origin signal and a left eye gaze origin signal
   the combined gaze signal comprises the combined gaze direction signal and the combined gaze origin signal.

10. The eye tracking system of claim 1, the operations further comprising determining the right eye weighting and the left eye weighting such that they are normalised.

11. The eye tracking system of claim 1, the operations further comprising:
    determining the right eye weighting based on a non linear function that relates a right eye pupil variation to the right eye weighting; and
    determining the left eye weighting based on a non linear function that relates a left eye pupil variation to the left eye weighting.

12. The eye tracking system of claim 1, the operations further comprising:
    for each of the one or more eye feature signals:
       calculating a right eye feature variation based on the eye feature signals for the plurality of right eye images; and
       calculating a corresponding left eye feature variation based on the eye feature signals for the plurality of left eye images; and
       determining the right eye weighting and the left eye weighting based on a right eye pupil variation, a left eye pupil variation, the one or more right eye feature variations and the one or more left eye feature variations.

13. The eye tracking system of claim 12, the operations further comprising determining the right eye weighting and the left eye weighting by:
for each of the one or more eye feature signals:
determining a feature weighting pair comprising a right eye feature weighting based on the right eye feature variation and a left eye feature weighting based on the left eye feature variation;
normalising a pupil weighting pair and the one or more feature weighting pairs;
determining a minimum normalised weight of all weightings in the normalised pupil weighting pair and the one or more normalised feature weighting pairs; and
determining the right eye weighting and the left eye weighting as the normalised pupil weighting pair or normalised feature weighting pair that contains the minimum normalised weight.

14. The eye tracking system of claim 1, wherein the one or more eye feature signals represent one or more of:
pupil position;
pupil radius;
gaze origin;
cornea position;
one or more corneal reflections;
iris position;
iris radius;
eye corner position; and
number of matched illuminator glint pairs.

15. The eye tracking system of claim 1, further comprising a buffer configured to store a plurality of pupil signals that correspond to the most recent right eye images and the most recent left eye images, and the operations further comprising:
calculating a right eye pupil variation for the pupil signals of the right eye images that are stored in the buffer; and
calculating a left eye pupil variation for the pupil signals of the left eye images that are stored in the buffer.

16. The eye tracking system of claim 15, the operations further comprising updating the right eye pupil variation and the left eye pupil variation with a moving average filter as the contents of the buffer are updated.

17. The eye tracking system of claim 1, wherein a head mounted device comprises the eye tracking system.

18. A method for calculating a combined gaze signal, the method comprising:
receiving a plurality of right eye images of a right eye of a user;
receiving a plurality of left eye images of a left eye of the user, each left eye image in the plurality of left eye images corresponding to a respective right eye image in the plurality of right eye images;
receiving an eye feature signal representing a detected image feature, for each of the plurality of right eye images and each of the plurality of left eye images;
calculating a right eye feature variation of the eye feature signals for the plurality of right eye images and a left eye feature variation of the eye feature signals for the plurality of left eye images;
determining a right eye weighting and a left eye weighting based on the right eye feature variation and the left eye feature variation, respectively; and
for one or more right eye images and one or more corresponding left eye images: determining a right eye gaze signal based on the right eye image and a left eye gaze signal based on the corresponding left eye image; and
calculating a combined gaze signal from a weighted sum of the right eye gaze signal and the left eye gaze signal using the right eye weighting and the left eye weighting.

19. One or more non transitory computer readable storage media storing computer executable instructions that, when executed by a computing system, causes the computing system to perform operations comprising:
receiving a plurality of right eye images of a right eye of a user;
receiving a plurality of left eye images of a left eye of a user, each left eye image in the plurality of left eye images corresponding to a respective right eye image in the plurality of right eye images;
receiving an eye feature signal representing a detected image feature for each of the plurality of right eye images and each of the plurality of left eye images;
calculating a right eye feature variation of the eye feature signals for the plurality of right eye images and a left eye feature variation of the eye feature signals for the plurality of left eye images;
determining a right eye weighting and a left eye weighting based on the right eye feature variation and the left eye feature variation, respectively; and
for one or more right eye images and one or more corresponding left eye images: determining at least one right eye gaze signal based on the right eye image and at least one left eye gaze signal based on the corresponding left eye image; and
calculating a combined gaze signal from a weighted sum of the right eye gaze signal and the left eye gaze signal using the right eye weighting and the left eye weighting.

* * * * *